United States Patent
Liu

(10) Patent No.: US 11,921,328 B2
(45) Date of Patent: Mar. 5, 2024

(54) HEAD ASSEMBLY OF OPTICAL FIBER CONNECTOR AND PROTECTION CAP THEREOF

(71) Applicant: Mei-Miao Liu, Taipei (TW)

(72) Inventor: Mei-Miao Liu, Taipei (TW)

(73) Assignees: ACSUPER TECHNOLOGIES INC., Myau-Li County (TW); SANWA Technologies, Inc., Plano, TX (US)

(*) Notice: Subject to any disclaimer, the term of this patent is extended or adjusted under 35 U.S.C. 154(b) by 0 days.

(21) Appl. No.: 17/699,081

(22) Filed: Mar. 19, 2022

(65) Prior Publication Data
US 2022/0308291 A1  Sep. 29, 2022

(30) Foreign Application Priority Data
Mar. 23, 2021 (TW) ................................ 110110341

(51) Int. Cl.
*G02B 6/36* (2006.01)
*G02B 6/38* (2006.01)

(52) U.S. Cl.
CPC ......... *G02B 6/3624* (2013.01); *G02B 6/3849* (2013.01)

(58) Field of Classification Search
CPC .. G02B 6/3624; G02B 6/3821; G02B 6/3849; G02B 6/3874; G02B 6/3893
See application file for complete search history.

(56) References Cited

U.S. PATENT DOCUMENTS

| | | | | |
|---|---|---|---|---|
| 5,212,752 A * | 5/1993 | Stephenson | ......... | G02B 6/3843 385/139 |
| 6,151,432 A * | 11/2000 | Nakajima | ......... | G02B 6/38875 385/60 |
| 7,614,799 B2 * | 11/2009 | Bradley | ................ | G02B 6/545 385/84 |
| 8,596,883 B2 * | 12/2013 | Taira | .................... | G02B 6/3849 385/78 |
| 9,297,976 B2 * | 3/2016 | Hill | ...................... | G02B 6/4473 |
| 10,180,541 B2 * | 1/2019 | Coenegracht | ........ | G02B 6/3825 |

* cited by examiner

*Primary Examiner* — Omar R Rojas

(57) ABSTRACT

A head assembly of optical fiber connector comprises a guiding head, a terminal base, an elastic element, a tube body, and a stopping element. The guiding head has a fiber channel for receiving optical fiber. The terminal base has a front base body and the rear base body, wherein the front base body is utilized for accommodating an end portion of the guiding head. The elastic element is utilized to accommodate with the terminal base. The tube body has an accommodation space for accommodating with the terminal base. The stopping element is arranged into the tube body, and has a through hole allowing the rear base body passing therethrough, wherein a second end of the elastic element is leaned against the stopping element. The present invention further provides a protection cap for protecting the head assembly from being damaged and contaminated.

4 Claims, 6 Drawing Sheets

HEAD ASSEMBLY OF OPTICAL FIBER CONNECTOR AND PROTECTION CAP THEREOF

CROSS-REFERENCE TO RELATED APPLICATION

This application claims the benefit of Taiwan Patent Application No. 110110341, filed on Mar. 23, 2021, in the Taiwan Intellectual Property Office of the R.O.C, the disclosure of which is incorporated herein in its entirety by reference.

FIELD OF INVENTION

The present invention relates to an optical fiber connector. In particular, it relates to a head assembly having a protection cap used for protecting a communication wire and the protection cap thereof.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100G optical module communication is not enough, and the future will be expected to move towards the era of 400G optical module communications.

In the field of 400G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

However, in practical applications, optical fibers need to be wired to transmit signals in various spaces. In the past, when wiring the indoor optical fiber network, the indoor space would initially install the pipe for the optical fiber to pass through, usually with a diameter of 6.0 mm. Due to the small diameter of the pipe, in order to prevent the optical fiber from touching the pipe wall and being damaged or polluted when the optical fiber passes through the pipe, there is usually a protection mechanism to protect the optical fiber head. Please refer to FIG. 1, which is a schematic diagram of a conventional head assembly of the optical fiber connector for protecting optical fibers. An end of the head assembly 1 has a guiding head 10, which is arranged on a terminal base 11. The terminal base 11 and an elastic element 12 are accommodated in the tube body 13, and the optical fibers in the optical fiber cable 14 pass through the tube body 13 and enter into the guiding head 10. The head assembly 1 further has a positioning member 16 for maintaining the position of the guiding head 10. In order to prevent the guiding head 10 of the optical fiber from being polluted and damaged, a protection cap 15 is disposed to protect the guiding head 10 and the optical fibers in the guiding head 10. However, in the conventional technology, the protection cap 15 is sleeved on the guiding head 10 by the friction force between the protection cap 15 and the guiding head 10. Due to the small diameter of the pipe, the protection cap 15 is likely to fall off during the threading process, resulting in contamination or damage to the guiding head 104. The extending arm 130 of the tube body 13 is also easily deformed and broken due to its protrusion. In addition, there is a rotational tolerance when the positioning member 16 is combined with the terminal base 11, so that the optical loss is easily generated.

In summary, it's necessary for a novel head assembly to solve the problem of conventional optical fiber connectors.

The above information disclosed in this section is only for enhancement of understanding of the background of the described technology and therefore it may contain information that does not form the prior art that is already known to a person of ordinary skill in the art.

SUMMARY OF THE INVENTION

The present invention provides a head assembly of an optical fiber connector and a protection cap thereof. The design of the protection cap is to protect the guiding head of the optical fiber connector through the combination of mechanical structure. In the process of wiring the head assembly through the tube, various parts of the head assembly would not fall off, so as to avoid the damage or pollution of the optical fiber.

The present invention provides a head assembly of an optical fiber connector and a protection cap thereof. With the detachable and tool-free mechanism assembly design, after the optical fiber head assembly passes through the tube, the protection cap can be disassembled or continued to be used, so as to achieve the effect of convenient assembly and effective protection of the optical fiber head. Wherein, the protection cap is a two-piece mechanism assembly design, which can be disassembled after wiring is completed, or can be retained as a protection cap for optical fiber connectors.

Therefore, the present invention provides a head assembly of an optical fiber connector, comprising: a guiding head, having a guiding channel for receiving an optical fiber; a terminal base, having a front base body and a rear base body, wherein the front base body is accommodated with an end portion of the guiding head; an elastic element, sleeved on a periphery of the terminal base, wherein a first end of the elastic element is leaned against the front base body; a tube body, having an accommodation space and being accommodated with the terminal base, wherein the tube body has a stopping groove connected with the accommodation space; and a stopping element, disposed into the tube body and having a through hole, wherein when the stopping element is disposed in tube body, the rear base body is allowed to pass through the through hole, and a second end of the elastic element is leaned against the stopping element.

In one embodiment of the present invention, the stopping element has a positioning structure, and the stopping groove is accommodated with the positioning structure to allow the stopping element to be positioned in the tube body when the stopping element is disposed into the tube body.

In one embodiment of the present invention, a first buckle structure corresponding to a tube wall of the front base body is disposed on the tube body.

In one embodiment of the present invention, the head assembly of the optical fiber connector further comprises a protection cap sleeved on the tube body to allow the guiding head and the terminal base to be covered in the protection cap, wherein the protection cap has a second buckle structure, the second buckle structure is buckled with the first buckle structure when the protection cap is sleeved on the tube body.

In one embodiment of the present invention, the protection cap further comprises: a metal sleeve, sleeved on the tube body to allow the guiding head and the terminal base to be covered in the metal sleeve, and a tube wall of the metal sleeve having a first combining structure and a second buckle structure; and a cover body, combined with the metal sleeve, and having a second combining structure and a protection space, wherein the second combining structure is combined with the first combining structure, the protection space is accommodated with the guiding head when the cover body is combined with the metal sleeve.

In one embodiment of the present invention, an end portion of the cover body has a plurality of engaging structures, and the front base body has the plurality of engaging slots corresponding to the plurality of engaging structures, which are respectively embedded into the corresponding engaging slots when the cover body is combined with the metal sleeve.

Furthermore, the present invention also provides a protection cap combined with a head assembly of an optical fiber connector, for covering the head assembly of the optical fiber connector, comprising: a metal sleeve, being a hollow tube, wherein a tube wall of the metal sleeve has a first combining structure; and a cover body, embedded into the metal sleeve, and having a second combining structure and a protection space, wherein an end portion of the cover body is embedded into the metal sleeve to allow the second combining structure to combine with the first combining structure.

In one embodiment of the present invention, the first combining structure is a through hole, and the second combining structure is a convex block for embedding into the through hole.

In one embodiment of the present invention, an end portion of the cover body has a plurality of engaging structures, which are respectively embedded into the corresponding engaging slots when the plurality of engaging structures are combined with the head assembly of the optical fiber connector.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Figure 1:
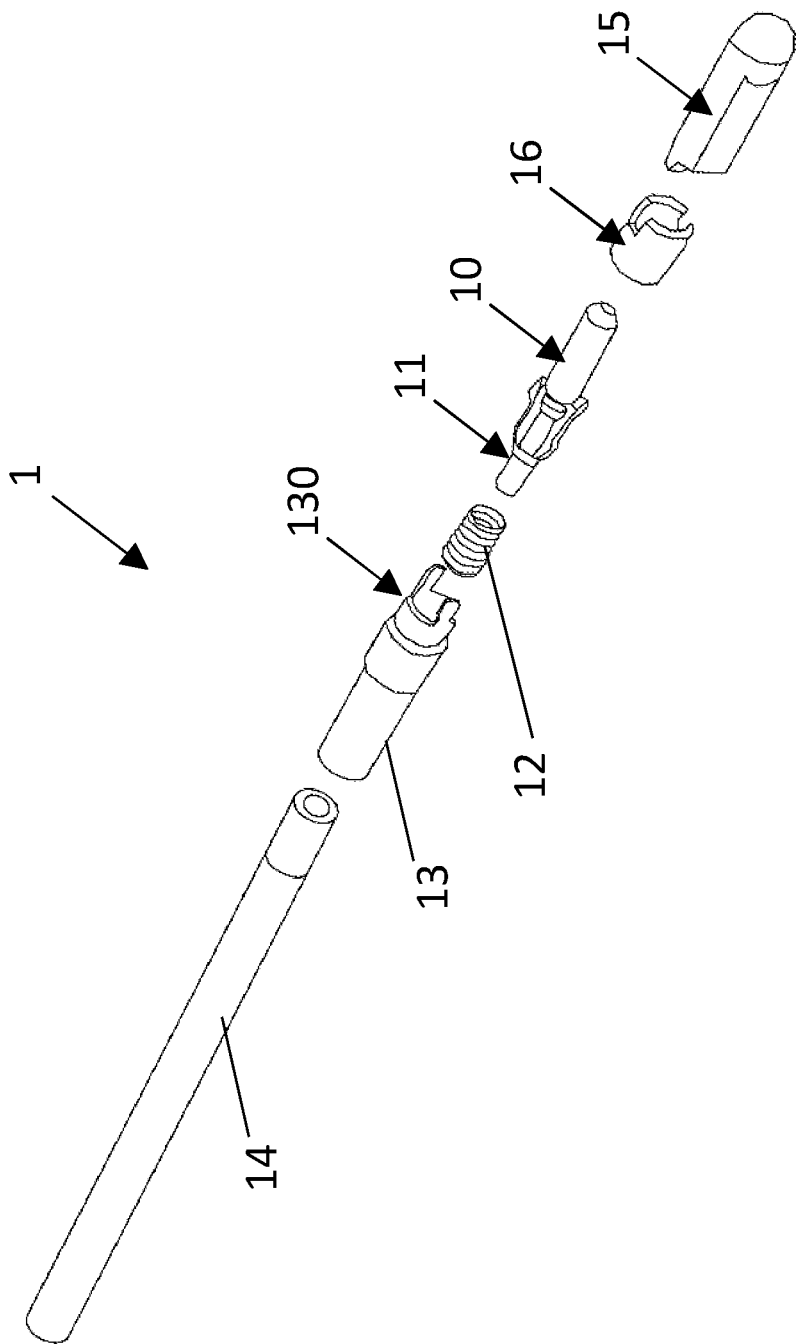
FIG. 1 is a schematic diagram of a conventional head assembly of the optical fiber connector for protecting optical fibers.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate a head assembly of optical fiber connector and protection cap thereof and to aid it of skilled in the art in practicing this invention. These embodiments are merely exemplary embodiments and in no way to be considered to limit the scope of the invention in any manner.

Figure 2:
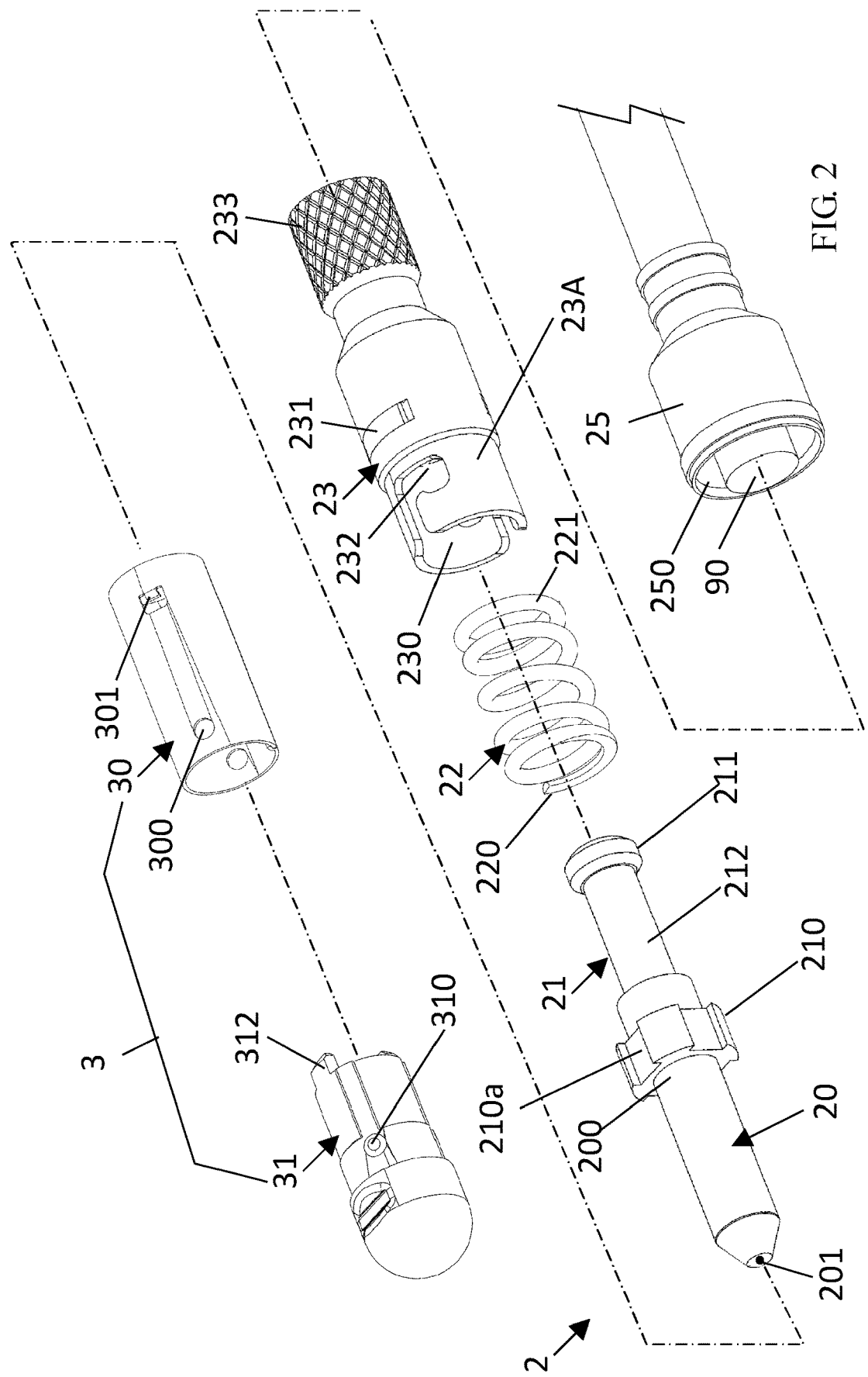
FIG. 2 is a three-dimensional exploded schematic diagram of a head assembly and a protection cap of the present invention.
Figure 3:
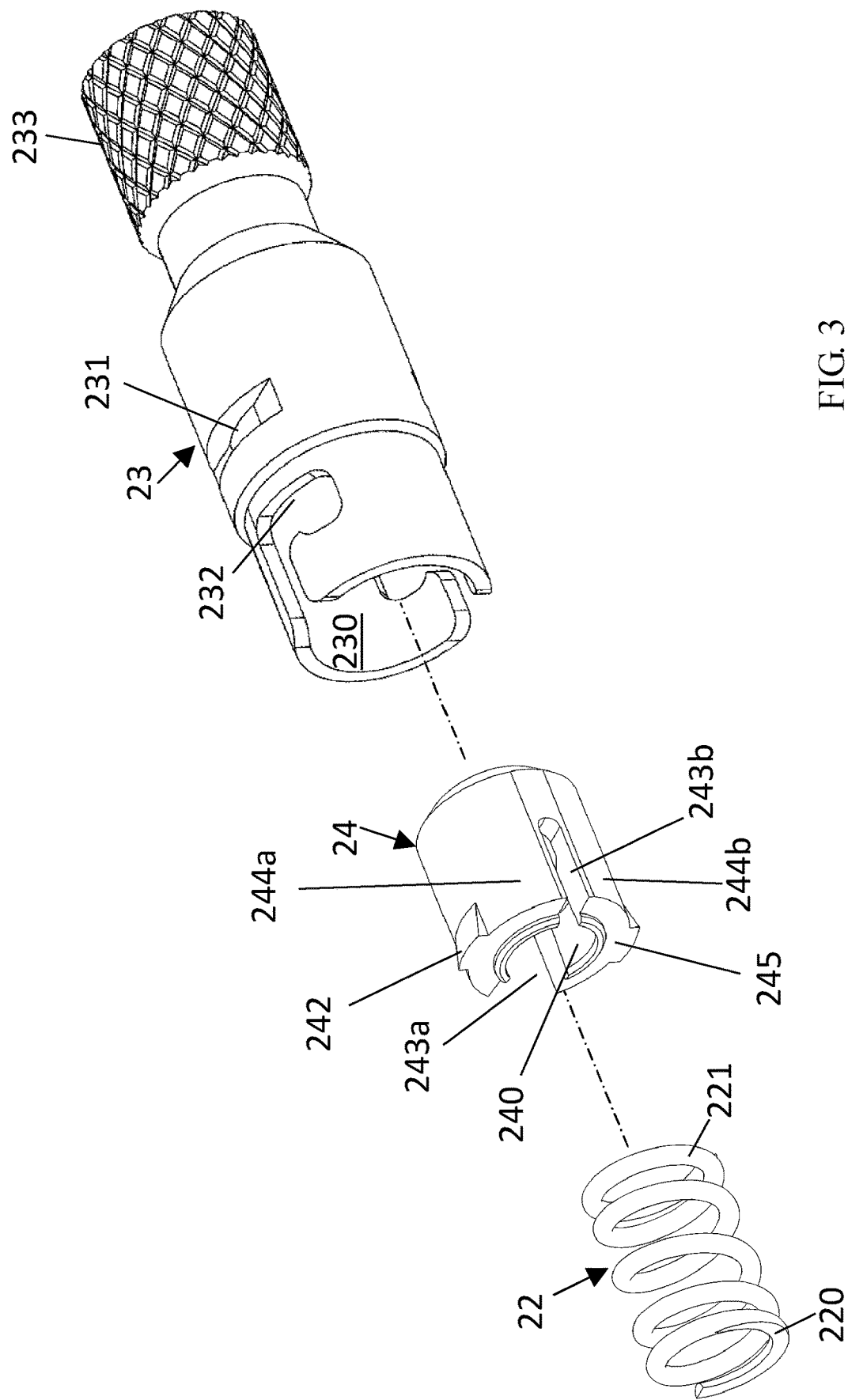
FIG. 3 is a schematic diagram of an embodiment of a tube body and a stopping element of the present invention.

Please refer to FIGS. 2 and 3, in which FIG. 2 is a three-dimensional exploded schematic diagram of a head assembly and a protection cap of the present invention, and FIG. 3 is a schematic diagram of an embodiment of a tube body and a stopping element of the present invention. In this embodiment, the head assembly 2 includes a guiding head 20, a terminal base 21, an elastic element 22, a tube body 23 and a stopping element 24. Wherein, the guiding head 20 has a guiding channel for receiving the optical fiber, which is the conventional technology and would not be repeated here. The terminal base 21 has a front base body 210 and a rear base body 211, a first extending portion 212 is formed between the front base body 210 and the rear base body 211, two ends of first extending portion 212 are respectively connected with the front base body 210 and the rear base body 211. The front base body 210 is used for combining with the end portion 200 of the guiding head 20, and an engaging slot 210a is disposed around the front base body 210. The elastic element 22 is sleeved on the periphery of the first extending portion 212 of the terminal base 21, and a first end 220 of the elastic element 22 is leaned against the front base body 210. The tube body 23 has a first accommodation space 230 for accommodating the terminal base 21, and the tube body 23 has a stopping groove 231 connected with the first accommodation space 230.

The stopping element 24 is arranged in the tube body 23, and the stopping element 24 has a through hole 240, which accommodates the rear base body 221 when the stopping element 24 is arranged into the first accommodation space 230 of the tube body 23. Please refer to FIG. 4, which is a schematic cross-sectional view of the combination of the stopping element and the tube body. In this embodiment, the rear base body 221 has an annular protruding portion 2110, and the inner wall of the through hole 240 of the stopping element 24 has a stopping surface 241. When the rear base body 211 is accommodated into the through hole 240, the protruding portion 2110 is leaned against the stopping surface 241, so as to have the effect of positioning an end of the terminal base 21. The terminal base 21 has a channel 213 to allow optical fibers pass through. In addition, there is a positioning structure 242 on the outer periphery of the stopping element 24. When the stopping element 24 is arranged into the tube body 23, the positioning structure 242 is inserted into the stopping groove 231, so that the stopping element 24 is positioned in the tube body 23.

Figure 4:
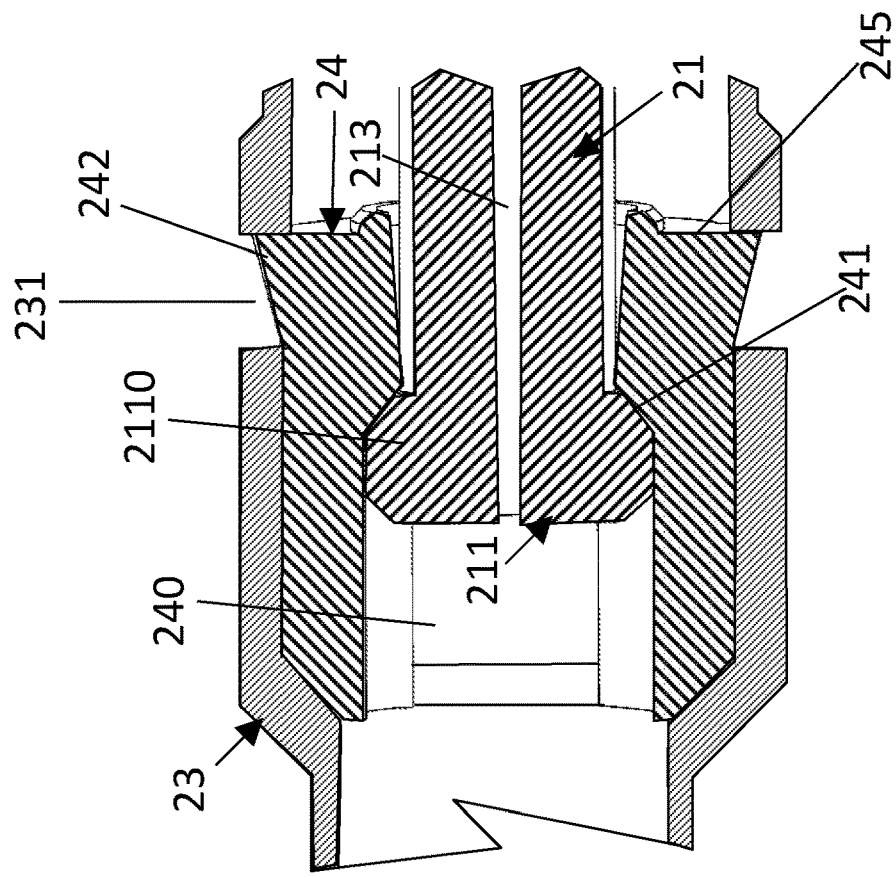
FIG. 4 is a schematic cross-sectional view of the combination of the stopping element and the tube body.

Please refer to FIGS. 2, 3 and 4, recessing grooves 243a and 243b are formed on the wall of the stopping element 24, wherein the recessing groove 243 a has a predetermined width to allow the first extending portion 212 and the rear base body 211 of the terminal base 21 to fit into the stopping element 24. The walls 244a and 244b on both sides of the recessing grooves 243a and 243b are flexible because of the recessing grooves 243a and 243b, and the positioning structure 242 is deformed by forcing the walls 244a and 244b to be separated from the stopping groove 231, so that the stopping element 24 may be removed from the tube body 23. As shown in FIGS. 2 and 3, the first end 220 of the elastic element 22 is leaned against the front base body 210, and the second end 221 of the elastic element 22 is leaned against the stopping element 24. As shown in FIGS. 2 and 3, the first end 220 of the elastic element 22 is leaned against the front base body 210, and the second end 221 of the elastic element 22 is leaned against the stopping element 24. In this embodiment, the second end 221 of the elastic element 22 is leaned against the end wall 245. The stopping element 24 provides a sliding space for the terminal base 21 when the guiding head 20 is pushed, and the elastic element 22 provides an elastic restoring force for the terminal base 21 to return to its original position. The tube body 23 has a first buckle structure 232 corresponding to the tube wall of the front base body 210, the function of which would be described later.

An end of the tube body 23 has a second extending portion 233 for coupling with the cable tube 25. In this embodiment, the cable tube 25 has a second accommodation space 250 for allowing the optical fiber cable 90 to pass through. Optical fibers within the fiber optic cable 90 pass through the channel 213 and the guiding head 20 via the through hole 240. Optical fiber is disposed into the guiding head 20. When wiring within the chamber, if the fiber optic cable 90 is passed through the pipe without properly protecting the guiding head 20, the guiding head 20 would move within the pipe to hit the pipe wall and be damaged or contaminated. Therefore, in this embodiment, as shown in FIG. 2, the present invention provides a protection cap 3 covering the periphery of the guiding head 20 to protect the guiding head 20. In this embodiment, the protection cap 3 includes a metal sleeve 30 and a cover body 31. The metal sleeve 30 is sleeved on the tube body 23, so that the guiding head 20 and the terminal base 21 are covered in the metal sleeve 30, and the tube wall of the metal sleeve 30 has a first combining structure 300 and a second buckle structure 301, wherein when the metal sleeve 30 is sleeved on a buckle tube 23A of the tube body 23, the second buckle structure 301 is embedded into the first buckle structure 232 of the tube body 23.

Figure 5:
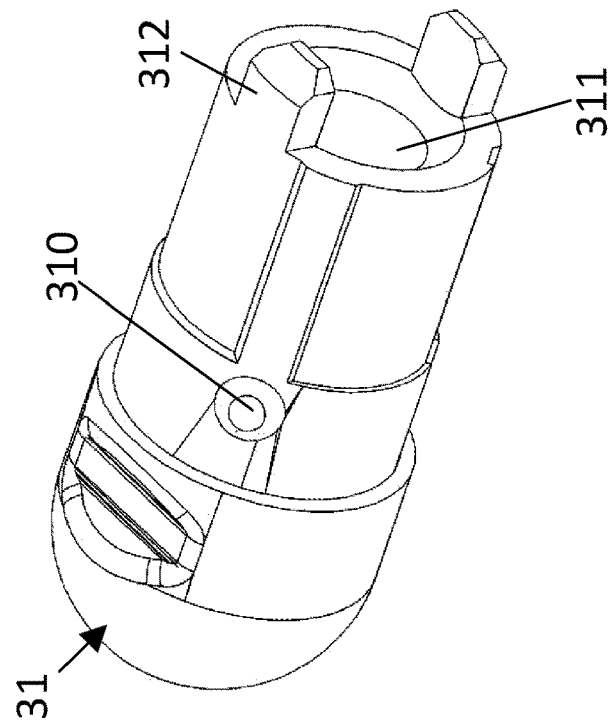
FIG. 5 is a schematic diagram of different viewing angles of a cover body in an embodiment of the present invention.

Please refer to FIGS. 2 and 5, wherein FIG. 5 is a schematic diagram of different viewing angles of a cover body in an embodiment of the present invention. The cover body 31 is combined with the metal sleeve 30, and the cover body 31 has a second combining structure 310 and a protection space 311, wherein the second combining structure 310 is combined with the first combining structure 300. In this embodiment, the second combining structure 310 is a convex block, and the first combining structure 300 is a through hole, so that the second combining structure 310 may be embedded in the first combining structure 300 to achieve a stable combination effect. The protection space 311 is able to accommodate the guiding head 20 when the cover body 31 is combined with the metal sleeve 30. In addition, the cover body 31 located at an end of the tube body 23 has a plurality of engaging structures 312, and the front base body 210 has the plurality of engaging slots 210a corresponding to the engaging structures 312. When the cover body 31 is combined with the metal sleeve 30, the plurality of engaging structures 312 are respectively embedded into the corresponding engaging slots 210a, so that the cover body 31 may be more stably covered on the guiding head 20.

It should be noted that the protection cap 3 in this embodiment is combined by two mechanism, so that the protection cap 3 stably covers the periphery of the guiding head 20 and the terminal base 21. It would not happen that the optical fiber cable to be pulled in the pipe and cause the protection cap to fall off during wiring. This can solve the problem that, in the conventional technology, when the protection cap is combined with the guiding head by the friction force, the guiding head is contaminated because the optical fiber cable is pulled and fell off during wiring.

The first mechanism is that the cover body 31 and the metal sleeve 30 are coupled by combining the first combining structure 300 and the second combining structure 310. Therefore, the combination strength of the cover body 31 and the metal sleeve 30 is high, so that the cover body 31 and the metal sleeve 30 would not be separated from the terminal base 21 and the guiding head 20 when moving in the pipe, so as to effectively protect the guiding head 20 from contamination. The second mechanism is that when the metal sleeve 30 is sleeved on the buckle tube 23A of the tube body 23, the second buckle structure 301 is embedded into the first buckle structure 232 of the tube body 23. Through the two mechanism, the metal sleeve 30 and the cover body 31 can stably protect the guiding head 20, and would not disintegrate even if there is a non-axial force in the process of passing through the pipe. In addition, because the protection cap 3 has a design that is not easy to fall off, it further achieves the piping effect of allowing the optical fiber cable to pass through a smaller pipe diameter (e.g. less than 6 mm). If the diameter of the pipe can be reduced to a smaller size, the cost of wiring can be reduced, and the piping would not take up too much space.

Figure 6A:
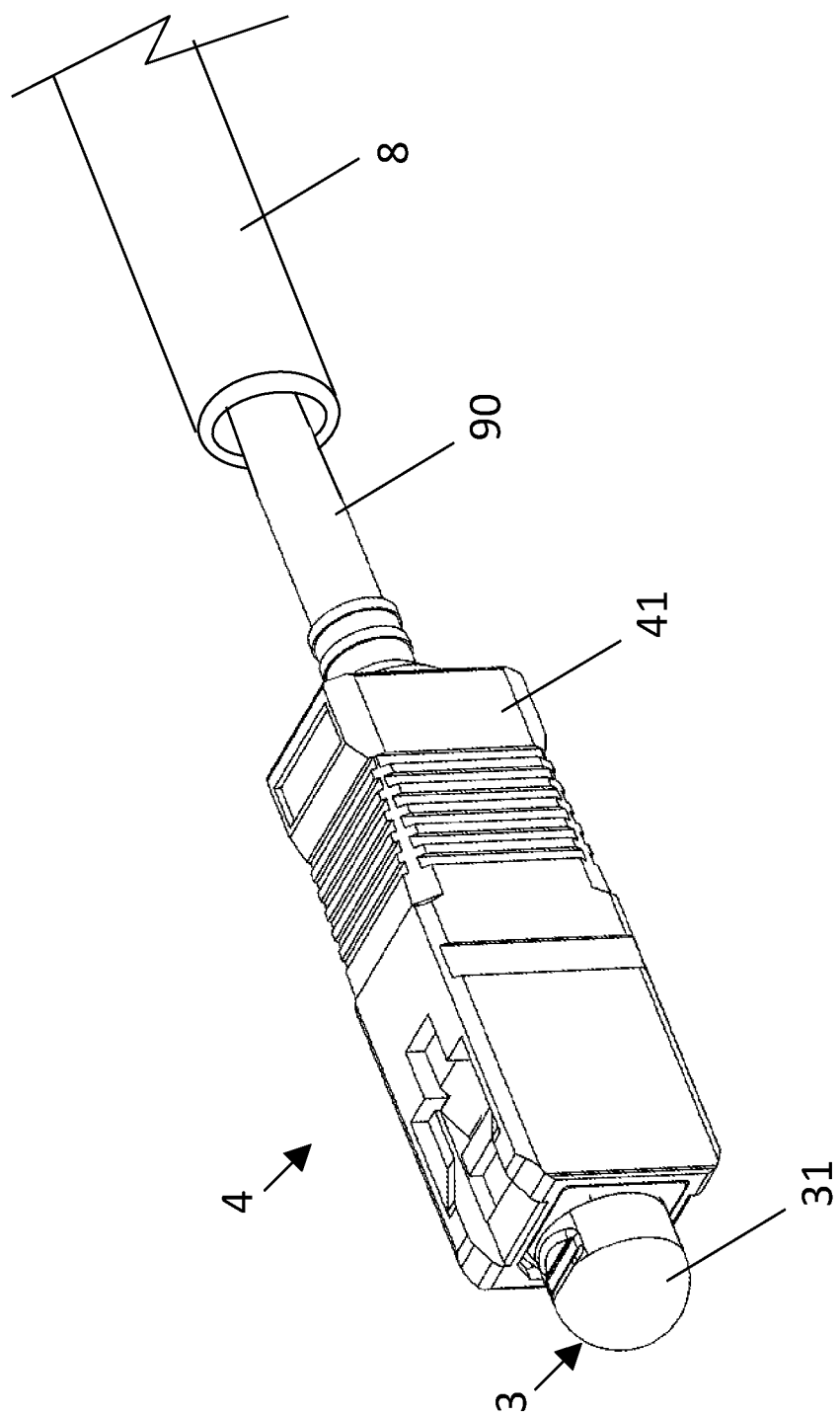
FIG. 6A is a schematic three-dimensional assembly diagram of the optical fiber connector having a protection cap of the present invention.
Figure 6B:
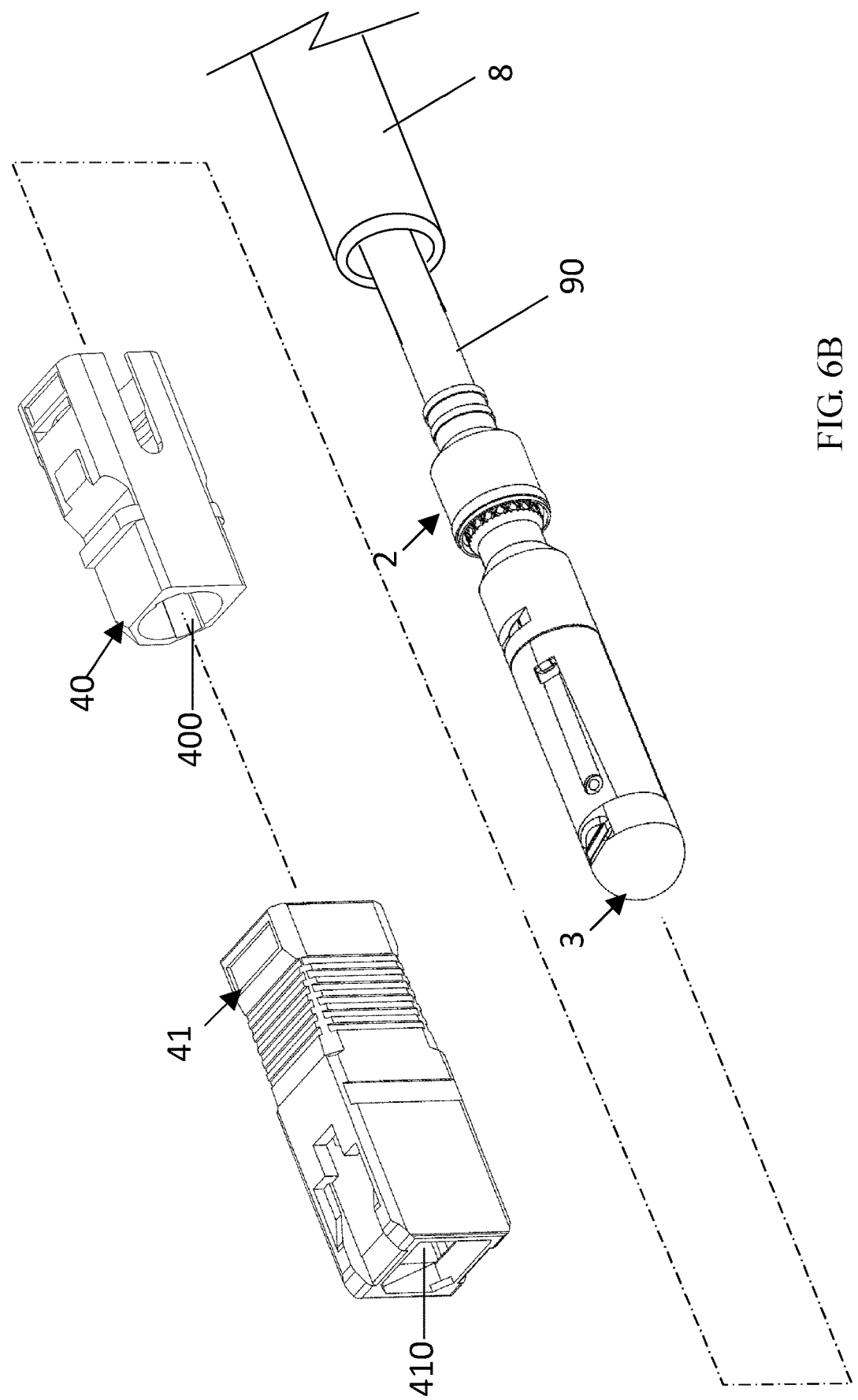
FIG. 6B is a schematic three-dimensional exploded diagram of the optical fiber connector having the protection cap of the present invention.

Please refer to FIGS. 6A and 6B, in which FIG. 6A is a schematic three-dimensional assembly diagram of the optical fiber connector having a protection cap of the present invention, and FIG. 6B is a schematic three-dimensional exploded diagram of the optical fiber connector having the protection cap of the present invention. The head assembly 2 of optical fiber connector is covered with the protection cap 3 and passes through the pipe 8, and then the protection cap 3 and the entire head assembly 2 pass through the hollow channel 400 of the first protection housing 40. Then, the element covered with the first protection housing 40 passes through the hollow channel 410 of the second protection housing 41 to form the structure shown in FIG. 6B. After the wiring process through the pipe 8 is completed, the metal sleeve 30 and the cover body 31 may be used continuously after being separated, and the cover body 31 can continue to be used as a dust cover. The protection cap in the present invention may be replaced with other types of protection caps.

To sum up, the protection cap designed by the present invention is to protect the guiding head of the optical fiber connector through the combination of mechanical structures. In the process of wiring the head assembly of optical fiber connector through the pipe, various parts of the head assembly would not fall off, so as to avoid the damage or contamination of the optical fiber. In addition, the protection cap can be disassembled or used continuously after the head assembly passes through the pipe through the detachable and tool-free assembly design, so as to achieve the effect of convenient assembly and protection of the optical fiber head. Wherein, the protection cap is a two-piece mechanism assembly design, which can be disassembled after wiring is completed, or can be retained as a protection cap for optical fiber connectors to increase the flexibility of use.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. A head assembly of an optical fiber connector, comprising:
   a guiding head, having a guiding channel for receiving an optical fiber;
   a terminal base, having a front base body and a rear base body, wherein the front base body is accommodated with an end portion of the guiding head;
   an elastic element, sleeved on a periphery of the terminal base, wherein a first end of the elastic element is leaned against the front base body;
   a tube body, having an accommodation space and being accommodated with the terminal base, wherein the tube body has a stopping groove connected with the accommodation space;
   a stopping element, disposed into the tube body and having a through hole, wherein when the stopping element is disposed in tube body, the rear base body is allowed to pass through the through hole, and a second end of the elastic element is leaned against the stopping element; and
   a protection cap, wherein the protection cap comprises:
      a metal sleeve, sleeved on the tube body to allow the guiding head and the terminal base to be covered in the metal sleeve, and a tube wall of the metal sleeve having a first combining structure and a second buckle structure; and
      a cover body, combined with the metal sleeve, and having a second combining structure and a protection space, wherein the second combining structure is combined with the first combining structure, the protection space is accommodated with the guiding head when the cover body is combined with the metal sleeve,
   wherein the stopping element has a positioning structure protruded from the stopping element, and the stopping groove is accommodated with the positioning structure to allow the stopping element to be inserted into the tube body when the stopping element is disposed into the tube body.

2. The head assembly of the optical fiber connector according to claim 1, wherein a first buckle structure corresponding to a tube wall of the front base body is disposed on the tube body.

3. The head assembly of the optical fiber connector according to claim 2, wherein the protection cap is sleeved on the tube body to allow the guiding head and the terminal base to be covered in the protection cap, and the protection cap has a second buckle structure, the second buckle structure is buckled with the first buckle structure when the protection cap is sleeved on the tube body.

4. The head assembly of the optical fiber connector according to claim 1, wherein an end portion of the cover body has a plurality of engaging structures, and the front base body has the plurality of engaging slots corresponding to the plurality of engaging structures, which are respectively embedded into the corresponding engaging slots when the cover body is combined with the metal sleeve.

* * * * *